United States Patent [19]

Bolieau et al.

[11] Patent Number: 4,829,765

[45] Date of Patent: May 16, 1989

[54] PULSED ROCKET MOTOR

[75] Inventors: Christopher W. Bolieau, Brigham City; Roger A. Grosgebauer, Ogden, both of Utah

[73] Assignee: Morton Thiokol, Inc., Chicago, Ill.

[21] Appl. No.: 813,808

[22] Filed: Dec. 27, 1985

[51] Int. Cl.⁴ .............................................. F02K 9/06
[52] U.S. Cl. ...................................... 60/250; 60/255; 60/256
[58] Field of Search ................ 60/250, 253, 256, 255, 60/204

[56] References Cited

U.S. PATENT DOCUMENTS

| | | | |
|---|---|---|---|
| 2,956,401 | 10/1960 | Kane | 60/256 |
| 4,075,832 | 2/1978 | Diesinger | 60/250 |
| 4,085,584 | 4/1978 | Jones | 60/250 |
| 4,594,945 | 6/1986 | Alexandris | 60/253 |

Primary Examiner—Donald P. Walsh
Attorney, Agent, or Firm—James C. Simmons; Gerald K. White

[57] ABSTRACT

A segmented rocket motor case includes wedge members for forcing the case segments into position to remove free play at the joint thereof which may otherwise interfere with or upset the missile's guidance system and throw it off target. A lap joint member for such a joint includes a shoulder having a surface for attachment of a membrane seal assembly for a pulsed rocket motor. A through bulkhead initiator communicates from the forward segment via a fitting which extends through the membrane seal assembly with an igniter for the propellant grain within the aft segment to eliminate the necessity of running explosive transfer lines along the outside of the case from a safe and arm device and other controls at the head end of the rocket motor.

1 Claim, 3 Drawing Sheets

PULSED ROCKET MOTOR

The present invention relates to solid propellant rocket motors.

The entire propulsive capacity of solid propellant rocket motors is usually spent during the combustion process of one mass of solid propellant. This is for the reason that once a solid propellant is ignited it is very difficult to stop the combustion process until the entire mass of ignited propellant has been consumed.

It has been proposed to provide a solid propellant rocket motor with an ability to fire more than once, that is, a rocket motor with a "start-stop-restart" capability commonly called a "pulsed" rocket motor by providing within the same case two or more solid propellant units such as a boost grain and a sustain grain separated by a membrane seal structure that enables the ignition of the propellant units to be independent of each other whereby discreet impulses are available upon command. Where the solid propellant units are positioned in tandem with each other, that is, with one solid propellant unit forward of the other, the membrane seal assembly extends over the inner diameter of the rocket motor case and is attached to the rocket motor case. The membrane seal assembly includes a bulkhead which includes a plurality of apertures for flow of combustion gases therethrough, and also includes a thin imperforate metallic membrane or cover of high strength but ductile material which covers the aft side of the bulkhead to seal the forward chamber from flow of gases thereinto upon ignition of the solid propellant unit in the aft chamber, and which, after the solid propellant unit in the aft chamber has been expended, pressure resulting from combustion of the solid propellant unit in the forward chamber upon ignition thereof at a selected time will cause the thin membrane to rupture and thus allow the escape of gases from the forward chamber through the apertures in the bulkhead to the aft chamber and then out the nozzle.

When a rocket motor such as a tactical missile with a pulsed motor configuration is provided with a single unsegmented case, the manufacturing process is more difficult than if the case were segmented and does not allow for separate processing of boost and sustain propellant grains.

When a pulsed segmented rocket motor is coasting, and the joint is not loaded, such as during interpulse delay, the case segments must be prevented from movement relative to each other. Free play or movement within the tolerance space of the connectors can upset a missile's guidance system and thus throw a missile off course.

It is therefore an object of the present invention to provide a pulsed rocket motor which is rugged and reliable yet easy to manufacture and which allows separate processing of the propellant grains.

It is still another object of the present invention to provide a segmented pulsed rocket motor wherein the joint between two case segments is stiffened so that free play therebetween is eliminated.

It is yet another object of the invention to provide such a pulsed segmented rocket motor wherein a membrane seal assembly separating the solid propellant chambers is reliably secured to the rocket motor case at the joint of the case segments.

It is another object of the present invention to provide a pulsed rocket motor wherein each of the solid propellant chambers may be designed to different pressures and be manufactured of different materials and/or different processes to achieve more efficient overall performance.

Each of the solid propellant grains for a pulsed rocket motor requires a separate ignition system. It is desirable that the safe and arm and other control devices for both ignition systems be disposed at the same location such as at the forward end of the rocket motor. The running of explosive transfer lines along the outside of the rocket motor case from the igniter for the aft propellant grain to the safe and arm and control devices therefor may result in damage to the explosive transfer lines from the weather and during transport.

It is therefore another object of the present invention to provide for control of initiation of ignition of both solid propellant grains of a pulsed rocket motor from the head end thereof.

It is another object of the present invention to provide such a rocket motor which does not require the running of explosive transfer lines along the outside surface of the rocket motor case.

It is still another object of the present invention to provide such a rocket motor which is durable and reliable yet inexpensive.

These and other objects of the invention will become apparent in the following detailed description of the preferred embodiments of the invention taken in connection with the accompanying drawings.

IN THE DRAWINGS

DETAILED DESCRIPTION OF THE PREFERRED EMBODIMENTS

Figure 1:
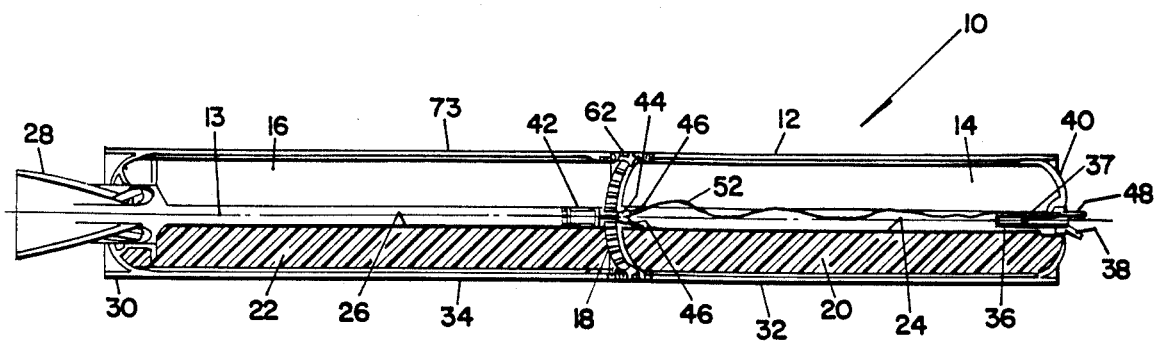
FIG. 1 is a side partially sectional view of a rocket motor embodying the present invention.

Referring to FIG. 1, there is shown at 10 a dual chamber pulsed rocket motor which is especially useful as the propulsion means for an air-launched missile. The rocket motor includes a cylindrical case 12 which has longitudinal axis 13 and which encloses forward and aft chambers 14 and 16 respectively which are separated by a membrane seal assembly 18 which extends over the inner diameter of the case 12 and is attached thereto. Contained within the chambers 14 and 16 are solid propellant units 20 and 22 respectively composed of any suitable propellant material and which have perforations 24 and 26 respectively extending axially over substantially the length thereof along the axis 13 thereof. A suitable nozzle 28 of converging-diverging type is attached to the aft end 30 of the rocket motor 10 in a central opening in the aft chamber 16 in flow communication with the grain perforation 26.

In order to provide freedom to design the chamber walls for different pressures, to allow the chamber walls to be composed of different materials and/or different processes, and to allow less difficult separate processing of the propellant grains 20 and 22 respectively for more efficient overall motor performance in accordance with the present invention, the case 12 is composed of a forward case segment 32 for the forward chamber 14 and an aft case segment 34 for the aft chamber 16. This also permits the two chambers 14 and 16 to be manufactured separately and then joined.

Extending into the perforation 24 of the forward propellant unit 20 is a suitable igniter 36 which is connected by suitable means 37 extending through the case wall 12 to a suitable initiator 38 in accordance with engineering principles of common knowledge to those of ordinary skill in the art to which this invention pertains. The initiator 38 is in turn connected by explosive transfer lines to a suitable safe and arm device (not shown) and other suitable control devices at the head end 40 of the rocket motor 10.

Shown at 42 is a suitable igniter for the aft solid propellant unit 22. The safe and arm device (not shown) and controls (not shown) for the aft igniter 42 are also contained at the head end 40 of the rocket motor in order to locate all of the controls and safe and arm devices at one location. In order to eliminate the undesirable requirement of running explosive transfer lines from the safe and arm mechanism to the aft igniter initiator around the outside of the rocket motor case 12 to the head end 40 in accordance with the present invention, the aft igniter 42 is disposed in the perforation 26 of the propellant grain of the aft chamber 16 at the forward end of the aft chamber 16 adjacent the membrane seal assembly 18 and is in communication via a through bulkhead fitting 44 with one or more suitable through bulkhead initiators 46, commonly known to those of ordinary skill in the art to which this invention pertains, which are disposed on the forward side of the membrane seal assembly 18. Through bulkhead initiator 46 is in turn in communication with another through bulkhead initiator 48 exterior of the case 12 at the head end 40 via the bulkhead fitting means 37 and completely confined detonating cord 52 which extends through the length of the forward grain perforation 24.

Figure 2:
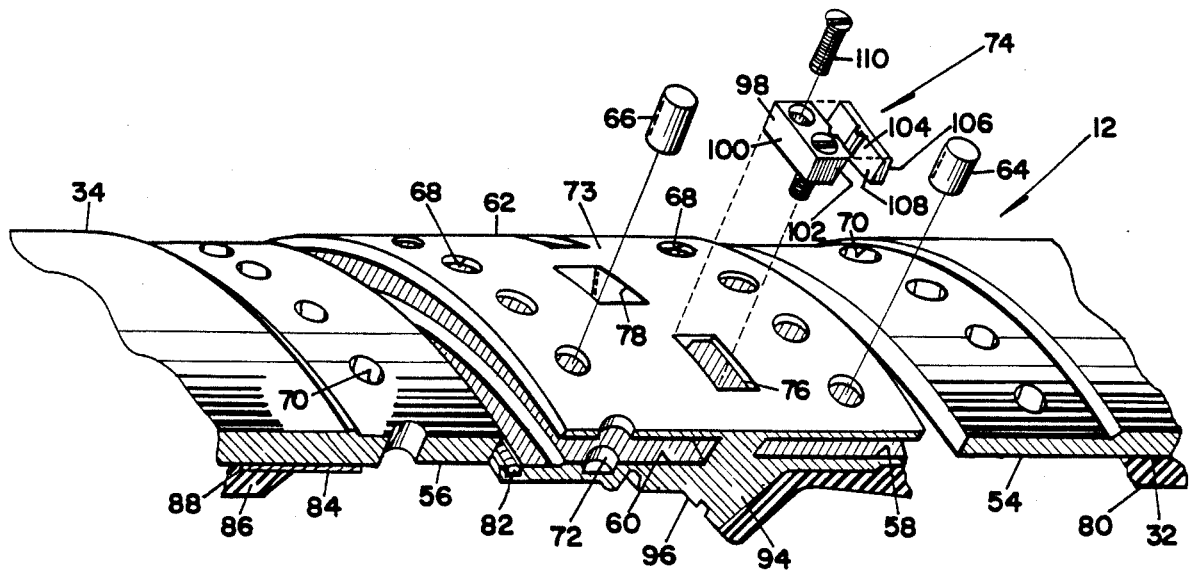
FIG. 2 is a perspective disassembled view of a joint between two case segments of the rocket motor of FIG. 1.

Referring to FIG. 2, there is shown in a disassembled view a joinder of the forward and aft segments 32 and 34 respectively which are composed of graphite fiber and resin composite material. However, it should be noted that in accordance with the present invention the segments 32 and 34 are not limited thereto and may be composed of other suitable materials such as, for example, steel or aramid fiber and resin composite. It is not necessary to the present invention that the segments 32 and 34 be composed of the same material. The joint ends of segments 32 and 34 are provided with reduced thickness tangs 54 and 56 respectively which are inserted in respective annular slots 58 and 60 respectively of a cylindrical preferably metallic double lap joint member 62 wherein the ends of the segments 32 and 34 are sandwiched in the slots 58 and 60 respectively of member 62 and are joined thereto by rows of pins 64 and 66 respectively each of which is inserted in an aperture 68 of the member 62 then an aperture 70 in the respective tang and then in another aperture 72 of member 62 radially inwardly of the respective slot 58 and 60, the exterior of the case 12 being illustrated at 73.

In order to reduce free play between the segments 32 and 34 and the lap joint member 62, the tangs 54 and 56 and the pins 64 and 66 are machined to fit the respective slots 58 and 60 and apertures 68, 70, and 72 respectively with close tolerances. However, this reduction in free play may usually not be sufficient to prevent interference with or upsetting of a sensitive missile guidance system while the missile is coasting, such as during interpulse delay, which interference may throw the missile off target. In order to eliminate such free play so that the joint is "stiff", there is provided, in accordance with the present invention, a wedge means for forcing the respective segment 32 and 34 against the respective pins 64 and 66 to thus take up the tolerance space around the joint and eliminate the free play. A pair of such wedge means for two of the adjacent pins 64 is shown generally at 74. This wedge assembly 74 is insertable radially inwardly into a slot 76 in the exterior surface 73 of the lap joint member 62. Alternate slots 78 around the circumference of the lap joint member 62 are provided to accommodate wedge assemblies for pins 66 for the aft segment 34.

Although the case segments 32 and 34 may be made out of any suitable material in accordance with the present invention such as, for example, steel or aramid fiber and resin composite material, it may be desirable that the segments 32 and 34 be composed of a graphite fiber and resin composite material in which case, in order to maintain an adequate seal in accordance with this invention, the lap joint member 62 as well as the wedge assemblies 74 and pins 64 and 66 are preferably composed of titanium so as to be compatible with the thermal and stress corrosion properties of the graphite fiber and resin composite material making up the case segments. It is of course preferred that the lap joint member, wedge assemblies, and pins be compatible with the thermal and stress corrosion properties of the material of which the case segments are composed. Since separate segments 32 and 34 are provided for each of the chambers 14 and 16 respectively in accordance with the present invention, the segments may be manufactured separately to be composed of different materials, to have different cord lay up angles, and/or to be designed to different pressures to provide more efficient overall rocket motor performance.

Figure 12:
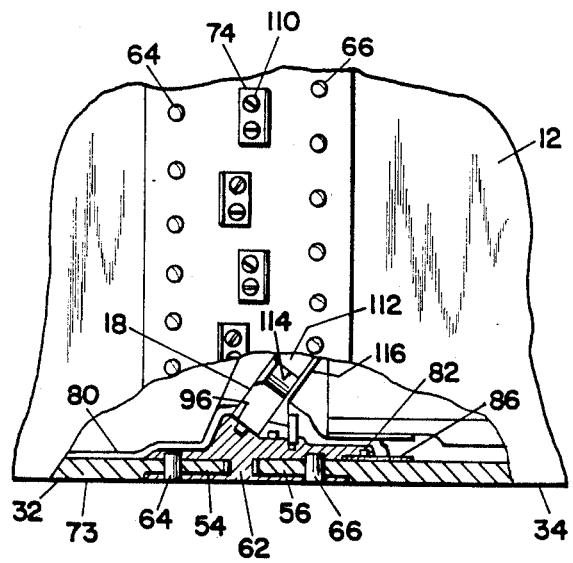
FIG. 12 is a detailed view of the joint and membrane seal assembly of FIG. 1.

One rocket motor segment, which in FIG. 2 is the forward segment 32, may be manufactured with the lap joint member 62 attached thereto in which case sealing is provided by application of an elastomeric bladder 80 spanning the joint and sealingly attached to the radially inner surfaces of the segment 32 and the lap joint member 62 circumferentially therearound, as illustrated in FIGS. 2 and 12.

The other rocket motor segment 34 may then be attached to the lap joint member 62 in the field. In order to provide a seal between the aft segment 34 and the lap joint member 62 in the field in accordance with a preferred embodiment of the present invention, there is provided an o-ring 82 of elastomeric material between the radially inner surface of the segment 34 and the respective surface of the lap joint member 62. However, in order to provide good sealing contact with the segment 34, a circumferentially extending thin titanium sealing member 84 preferably having a thickness in the range of about 30 to 60 mils is bonded to the radially inner surface of the aft segment 34 for sealing contact with the o-ring 82. Another suitable elastomeric bladder 86 is then applied to the sealing member 84 and the radially inner surface of the aft segment 34 to span and seal the exposed point of connection 88 of the sealing member 84 to the segment 34, as illustrated in FIGS. 2 and 12.

Referring back to FIG. 1, in order to withstand the pressure within the aft chamber 16 during ignition thereof, the membrane seal assembly 18 is provided with a dish shape, that is, it has a convex surface 90 facing the aft chamber 16 and a concave surface 92 facing the forward chamber 14 so that the convex surface 90 is aft of the concave surface 92.

Figure 5:
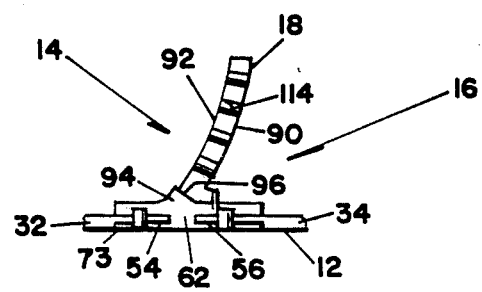
FIG. 5 is a detail view showing attachment of the membrane seal assembly to the joint of FIG. 2.

Referring back to FIG. 2 as well as to FIG. 5, the lap joint member 62 is configured to provide, in accordance with a preferred embodiment of the present invention, a radially inwardly extending shoulder 94 including a surface 96 extending at a suitable angle to receive the membrane seal assembly 18 which is then suitably attached thereto using engineering principles of common knowledge to those of ordinary skill in the art to which this invention pertains.

Figure 3:
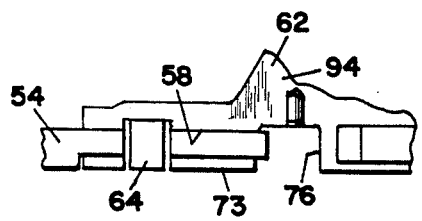
FIG. 3 is a sechematic view illustrating the joint of FIG. 2 before free play between the segments is eliminated.
Figure 4:
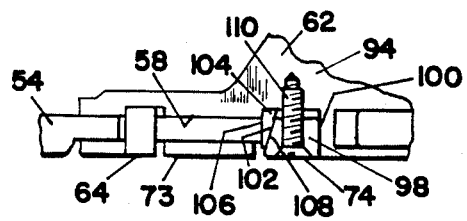
FIG. 4 is a schematic view illustrating the joint portion of FIG. 3 after the free play between the segments has been eliminated in accordance with the present invention.

Referring to FIG. 3, there is illustrated the pin tolerance containing free play which the wedge means 74 are provided to eliminate, the pin tolerance shown being exaggerated. The wedge means 74 includes a wedge 98 having one surface 100 which is generally straight to conform to the generally straight surface of the wedge slot 76 which faces away from the respective pin 64. The wedge surface 102 which faces the pin 64 extends radially inwardly at an angle so that the radially inner end of the wedge 98 is smaller than the radially outer end thereof. In order to prevent fraying of the composite material by the sliding of the wedge 98 along the edge surface thereof, the wedge 98 bears against a wedge bearing plate 104. One side 106 of bearing plate 104 bears against the respective tang 54 and another side 108 thereof bears against the wedge angled surface 102 and conforms thereto. Means such as screw 110 is provided to force the wedge 98 radially inwardly to provide a thrust load on the bearing plate 104 to force the respective tang 54 against the respective pin 64 to thus eliminate the free play as shown in FIG. 4. Joint preload can be varied by principles known to those of ordinary skill in the art to which this invention pertains, such as by changing the wedge ramp angle, by changing the number of wedges and/or screws, or by changing the screw torque.

Figure 6:
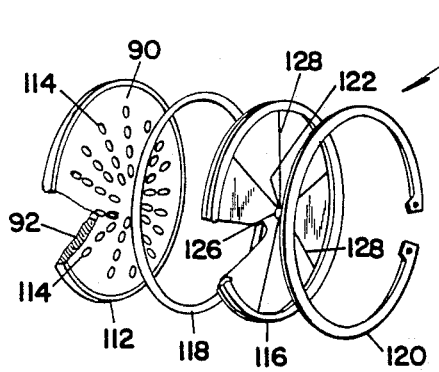
FIG. 6 is a perspective disassembled view of the membrane seal assembly of FIG. 5.
Figure 7:
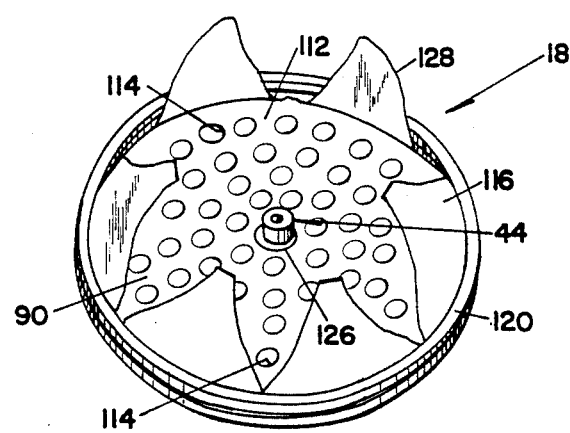
FIG. 7 is a perspective view illustrating the appearance of the membrane seal assembly of FIG. 5 after ignition of the forward solid propellant unit.

FIG. 6 illustrates in a disassembled view the membrane seal assembly 18. A bulkhead member 112, which may be composed of any suitable material such as phenolic material, is provided with a plurality of perforation means or apertures 114 which are preferably of a sufficient size and quantity to provide a flow area therethrough which is equal to approximately four times the nozzle area so as to minimize pressure drop therethrough but which are also positioned to provide maximum material strength in accordance with principles commonly known to those of ordinary skill in the art to which this invention pertains. A thin metallic burst diaphragm 116 composed of any suitable material such as, for example, stainless steel or nickel is provided along the aft or convex surface 90 of the membrane seal assembly 18, and a seal is provided therebetween by any suitable seal such as polyisoprene vulcanized seal 118, which in turn bonds the burst diaphragm 116 to the bulkhead 112. The entire membrane seal assembly 18 is retained firmly against the shoulder 94 of the joint member 62 by means of a suitable snap ring 120 or a suitable threaded retaining ring. Aperture 122 is provided centrally of the burst diaphragm 116 to cooperate with a centrally provided aperture 124, illustrated in FIG. 7, in bulkhead 112 for installation of the through bulkhead fitting 44. The burst diaphragm 116 is scored along circular score line illustrated at 126 around the bulkhead fitting 44 and by a series of score lines illustrated at 128 from score line 126 to the perimeter of the burst diaphragm 116 in pie-shaped fashion to weaken the burst diaphragm 116 so that it may rupture easily and predictably upon a pressure in the forward chamber 14 exceeding the pressure in the aft chamber 16 by a substantial amount when the propellant 20 in the forward chamber 14 is ignited to allow propulsion gases from the forward chamber 14 to pass through the apertures 114 in the bulkhead 112 into the aft chamber 16 and then out through the nozzle 28 providing thrust. However, during combustion of the propellant in the aft chamber 16, the burst diaphragm 116 is in sealed position over the apertures 114 in the bulkhead 112 to prevent the entrance of gases into the forward chamber 14 to maintain the forward chamber 14 free of ignition thereby.

Figure 8:
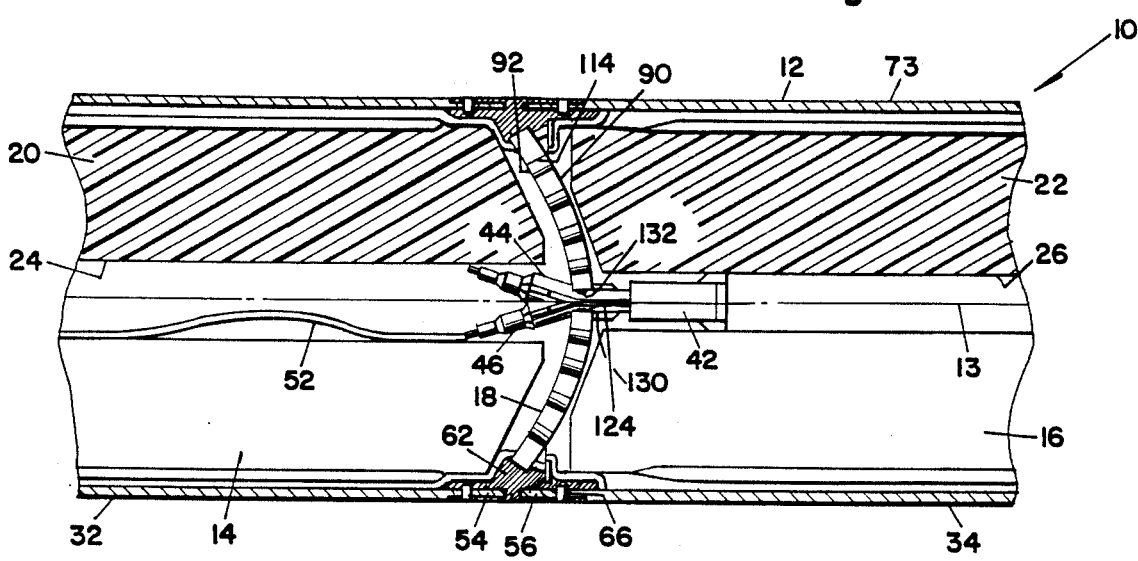
FIG. 8 is a detail view of the membrane seal assembly and the ignition assembly for the aft solid propellant unit of FIG. 1.

FIG. 8 is a close-up view of the through bulkhead initiator 46 for the aft chamber 16, including the through bulk-head fitting 44 sealingly attached to the membrane seal assembly 18 by means of a suitable vulcanized seal 130 and O-ring 132 and which includes a channel for communication between the initiator 46 and the igniter 42. The igniter 42 and initiator 46 are sealingly screwed onto the bulkhead fitting 44.

Figure 9:
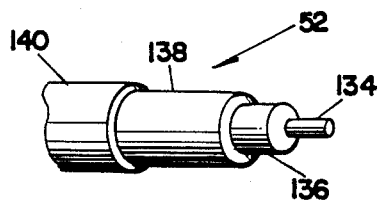
FIG. 9 is a perspective view of a portion of the detonating cord of FIG. 1 with parts broken away.
Figure 11:
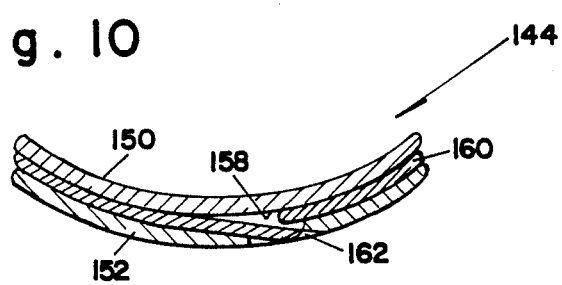
FIG. 11 is a view taken along lines 11—11 of FIG. 10.

The detonating cord 52 is preferably composed of consumable materials so that debris therefrom is not ejected out the nozzle. Referring to FIG. 9, the detonating cord 52 is preferably composed of a consumable core material 134 known as HNS IIA, which is cyclotrimethylene trinitramine, a secondary high explosive commonly used in linear explosive products. In order that the detonating cord 52 be consumable, the core material 134 is preferably surrounded by a layer of lead 136, then a layer of polyethylene 138, then five layers of aramid yarn material 140.

Figure 10:
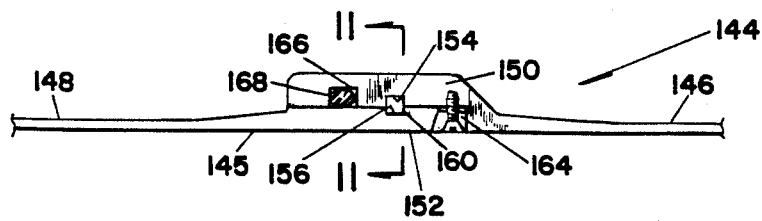
FIG. 10 is a schematic view of an alternative embodiment of the present invention.

Referring to FIG. 10, there is illustrated an alternative embodiment of the present invention. In this embodiment, a rocket motor portion generally illustrated at 144 having an exterior surface 145 is comprised of a forward segment 146 and an aft segment 148 which are connected directly together without an intervening lap joint member as previously described for FIGS. 1 through 9. One of the rocket motor segments 146 has an end portion 150 which is machined to overlap radially inwardly of and fit closely with the end portion 152 of the other rocket motor segment 148. The end portions 150 and 152 are provided with channels 154 and 156 respectively, which extend circumferentially thereabout in the radially outer surface of end portion 150 and the radially inner surface of end portion 152 respectively. These channels 154 and 156 are positioned and configured to mate and form an aperture 158 in the joined segments 146 and 148 through which is inserted a lock wire 160 of a suitable size such as, for example, 0.25 inches square. The insertion of the lock wire 160 provides a joint between the case segments 146 and 148 which, of necessity, must have some free play. Entrance to the aperture 158 is gained by means of a notch 162 which provides communication between the aperture 158 and the exterior surface of the aft end portion 152. In order to eliminate the free play between the segments 146 and 148 in accordance with the present invention, a wedge means 164, similar to wedge means 74 of FIG. 2 but need not include a bearing plate if the ease segments are metallic, is provided to force the case segments 146 and 148 apart and take up the tolerance space around the lock wire 160. Since the lock wire 160 alone cannot react torsional loads across the joints, the plurality of wedge means 164 about the circumference of the joint are additionally provided for reacting the torsional loads across the joint. O-ring 166 is provided in a groove 168 in one of the case segments 146 for positioning between surfaces of the case segments 146 and 148 to seal the joint.

It is to be understood that the invention is by no means limited to the specific embodiments which have been illustrated and described herein and that various modifications thereof may indeed be made which come within the scope of the present invention as defined by the appended claim.

We claim:

1. A rocket motor having at least two centrally perforated solid propellant units for providing at least two pulses, the rocket motor comprises: an elongated cylindrical case having a forward end and an aft aperture; a bulkhead means separating said solid propellant units and forming separate forward and aft combustion chambers in the rocket motor with one of said solid propellant units in each of said chambers; perforation means in said bulkhead means for providing communication between said chambers; a membrane seal positioned in the aft combustion chamber to cover said perforation means to preclude communication between said chambers when a higher pressure is present in the aft chamber than in the forward chamber and to rupture and thereby allow communication between said chambers when a higher pressure is present in said forward chamber than in said aft chamber; an igniter means disposed in the central perforation of said aft solid propellant unit for ignition thereof; means for transmitting energy to said igniter means for firing thereof, said energy transmission means including a centrally disposed aperture in each of said bulkhead and said membrane seal, an adapter means which has an energy transmission cavity means in communication with said igniter means and which extends through said apertures and is sealingly engaged to said membrane seal and said bulkhead means, and an initiating means in said forward chamber in communication with said energy transmission cavity means and sealingly engaged to said adapter means, and means for transmitting energy to said initiating means from the forward end; an igniter means disposed in the central perforation of said forward solid propellant unit for ignition thereof; means for transmitting energy to said igniter means disposed in the central perforation of said forward solid propellant unit; and a thrust nozzle fixed to said case in communication with said aft aperture.

* * * * *